US012684512B2

(12) United States Patent
Liu et al.

(10) Patent No.: US 12,684,512 B2
(45) Date of Patent: Jul. 14, 2026

(54) TRANSMISSION AND RECEPTION TIMING DETERMINATION FOR INTERFERENCE MEASUREMENT

(71) Applicant: ZTE CORPORATION, Shenzhen (CN)

(72) Inventors: Xing Liu, Shenzhen (CN); Xianghui Han, Shenzhen (CN); Xingguang Wei, Shenzhen (CN); Shuaihua Kou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 359 days.

(21) Appl. No.: 18/534,179

(22) Filed: Dec. 8, 2023

(65) Prior Publication Data

US 2025/0193818 A1    Jun. 12, 2025

Related U.S. Application Data

(63) Continuation of application No. PCT/CN2022/080440, filed on Mar. 11, 2022.

(51) Int. Cl.
H04L 5/00 (2006.01)
H04W 56/00 (2009.01)

(52) U.S. Cl.
CPC ....... H04W 56/0045 (2013.01); H04L 5/0051 (2013.01); H04W 56/006 (2013.01)

(58) Field of Classification Search
CPC ........... H04W 56/0045; H04W 56/006; H04W 24/08; H04L 5/0051; H04L 5/0048; H04L 5/0073; H04L 5/14
See application file for complete search history.

(56) References Cited

U.S. PATENT DOCUMENTS

| | | | |
|---|---|---|---|
| 2015/0350945 A1 | 12/2015 | Chae et al. | |
| 2016/0337999 A1 | 11/2016 | Lee | |
| 2021/0058884 A1* | 2/2021 | Liu | H04J 3/06 |
| 2023/0135149 A1* | 5/2023 | Krishnamurthy | H04W 56/0015 |
| | | | 455/456.1 |

FOREIGN PATENT DOCUMENTS

| | | | | | |
|---|---|---|---|---|---|
| GB | 2582442 A | * | 9/2020 | ......... | H04W 72/541 |
| WO | WO-2020/163392 A1 | | 8/2020 | | |

OTHER PUBLICATIONS

NPL—Samsung, "Timing alignment on cross-link for dynamic TDD", 3GPP TSG RAN WG1 Meeting NR#3, R1-1716037, Sep. 21, 2017, Nagoya, Japan (6 pages) (Year: 2017).*
Fujitsu, "Discussion on cross-link interference management", 3GPP TSG RAN WG1 Meeting #90, R1-1712749, Aug. 25, 2017, Prague, Czech Republic (3 pages).
Huawei et al., "On cross-link interference in IAB", 3GPP TSG RAN WG1 Meeting #94bis, R1-1810134, Oct. 12, 2018, Chengdu, China (10 pages).

(Continued)

*Primary Examiner* — Lan-Huong Truong
(74) *Attorney, Agent, or Firm* — Foley & Lardner LLP

(57) ABSTRACT

In some arrangements, a first network node determines reception timing of a Reference Signal (RS). The RS is transmitted by a second network node at transmission timing. The first network node receives from the second network node the RS according to the reception timing.

20 Claims, 9 Drawing Sheets

(56)                    References Cited

OTHER PUBLICATIONS

International Search Report and Written Opinion for PCT Appl. No. PCT/CN2022/080440, mailed on Nov. 28, 2022 (6 pages).
ZTE et al., "Channel sensing based scheme for cross-link interference mitigation in NR", 3GPP TSG RAN WG1 Meeting #88, R1-1701617, Feb. 17, 2017, Athens, Greece (10 pages).
ZTE et al., "Discussion on Measurement and RS Design for CLI Mitigation", 3GPP TSG RAN WG1 AH_NR#1 Meeting, R1-1700271, Jan. 20, 2017, Spokane, Washington (8 pages).
Extended European Search Report for EP Appl. No. 22930346.6, dated Oct. 9, 2024 (9 pages).
Samsung, "Timing alignment on cross-link for dynamic TDD", 3GPP TSG RAN WG1 Meeting NR#3, R1-1716037, Sep. 21, 2017, Nagoya, Japan (6 pages).
Office Action for MX Appl. No. MX/a/2023/014667, dated Feb. 24, 2026 (with English translation, 12 pages).

* cited by examiner

400

| Frequency Range and Band of Cell Used for Uplink Transmission | $N_{TA\_offset}$ (Unit: $T_c$) |
|---|---|
| FR1 FDD or TDD band with neither E-UTRA–NR nor NB-IoT–NR coexistence case | 25600 (Note 1) |
| FR1 FDD band with E-UTRA–NR and/or NB-IoT–NR coexistence case | 0 (Note 1) |
| FR1 TDD band with E-UTRA–NR and/or NB-IoT–NR coexistence case | 39936 (Note 1) |
| FR2 | 13792 |

Note 1: The UE identifies $N_{TA\_offset}$ based on the information n-TimingAdvanceOffset as specified in TS 38.331 [2]. If UE is not provided with the information n-TimingAdvanceOffset, the default value of $N_{TA\_offset}$ is set as 25600 for FR1 band. In case of multiple UL carriers in the same TAG, UE expects that the same value of n-TimingAdvanceOffset is provided for all the UL carriers according to clause 4.2 in TS 38.213 [3] and the value 39936 of $N_{TA\_offset}$ can also be provided for a FDD serving cell.

Note 2: Void

FIG. 4

Downlink Transmission Timing
Time-Domain Position 701 (BS)

700

Transmission Timing for RS Transmission
for Aggressor BS

Reception Timing for RS
Reception for Victim BS

Frame i (Aggressor BS)

T4

Frame i (Victim BS)

Time

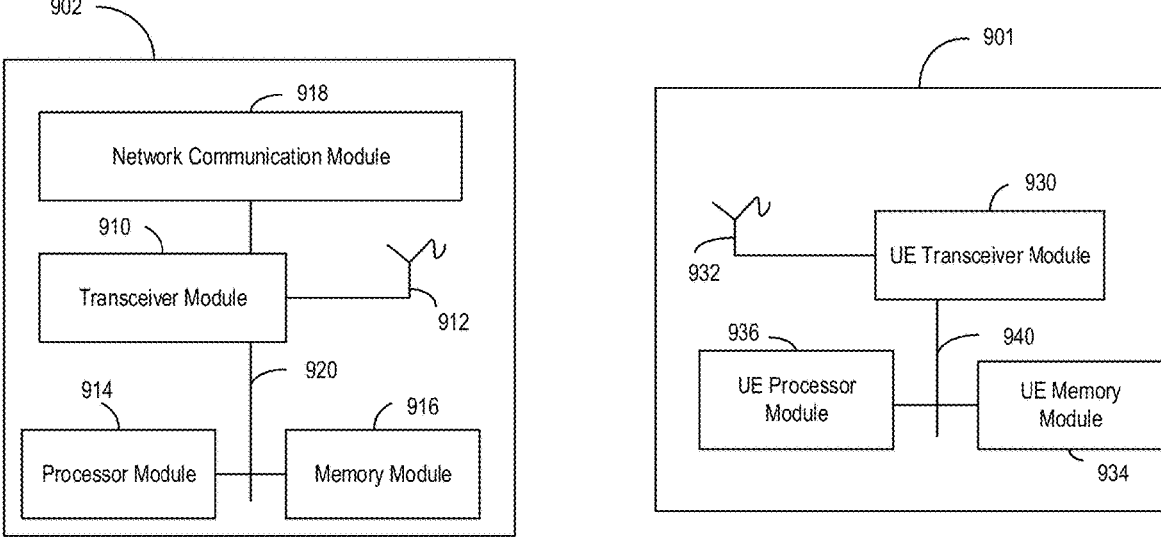
FIG. 9A                                    FIG. 9B
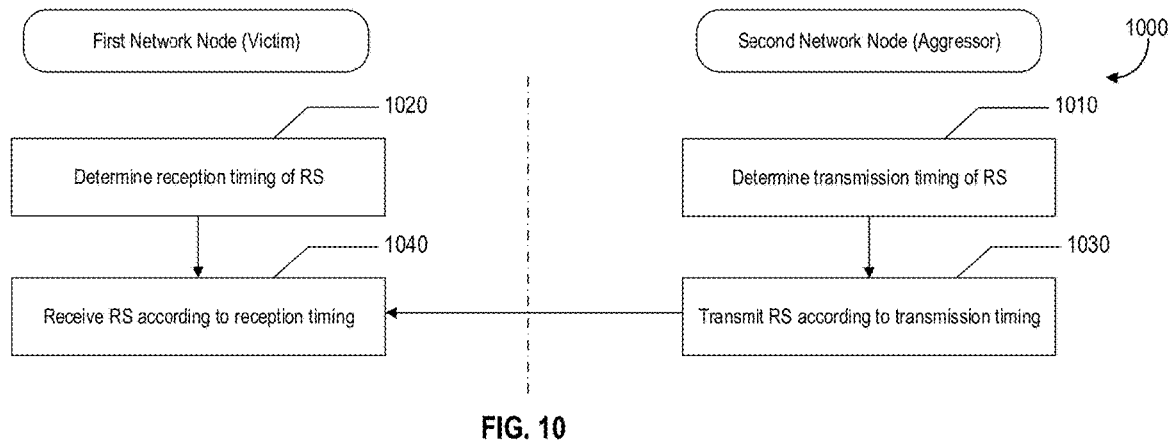
FIG. 10

TRANSMISSION AND RECEPTION TIMING DETERMINATION FOR INTERFERENCE MEASUREMENT

CROSS-REFERENCE TO RELATED APPLICATION

This application claims the benefit of priority under 35 U.S.C. § 120 as a continuation of PCT Patent Application No. PCT/CN2022/080440, filed on Mar. 11, 2022, the disclosure of which is incorporated herein by reference in its entirety.

TECHNICAL FIELD

The disclosure relates generally to wireless communication networks, and in particular, to determining uplink and downlink timing for interference measurement among nodes of the wireless communication networks.

BACKGROUND

In wireless communication systems (e.g., New Radio (NR), 4th Generation Mobile Communication Technology (4G), Long-Term Evolution (LTE), LTE-Advance (LTE-A), and 5th Generation Mobile Communication Technology (5G)), a network node (e.g., User Equipment (UE) or a Base Station (BS)) can receive and transmit signals simultaneously or switch between reception and transmission without delay under full duplex or flexible duplex. In the example in which full duplex is supported, the uplink and downlink configurations of neighbor cells may be different. In such an example, time-frequency resources of network nodes with different frame structures cause cross-link interference.

SUMMARY

In some arrangements, a first network node determines reception timing of a Reference Signal (RS). The RS is transmitted by a second network node at transmission timing. The first network node receives from the second network node the RS according to the reception timing

BRIEF DESCRIPTION OF THE DRAWINGS

FIG. 4 is a table illustrating default values for T0 or $N_{TA}$ offset, according to various arrangements.

FIG. 9A illustrates a block diagram of an example BS, according to various arrangements.

FIG. 9B illustrates a block diagram of an example UE, according to various arrangements.

FIG. 10 is a flowchart diagram illustrating an example method for transmitting RS for measuring interference, according to various arrangements.

DETAILED DESCRIPTION

Various example arrangements of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example arrangements and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The arrangements of the present disclosure relate to determining an appropriate interference coordination mechanism by determining the interference between nodes of a wireless communication system, sending reference signals, and measuring the interference.

Wireless communication networks such as 4G, LTE, LTE-A, and 5G face increasing demand for their usage. Based on current development trends, 4G and 5G systems are expected to support features such as Enhanced Mobile Broadband (eMBB), Ultra-Reliable Low-Latency Communication (URLLC), and Massive Machine-Type Communication (mMTC). Full duplex is required for 5G and further communication systems.

In wireless communication systems, time-domain resources are split between downlink and uplink in Time Division Duplex (TDD). Allocation of inadequate time duration for the uplink in TDD would result in reduced coverage, increased latency, and reduced capacity. To address these technical challenges of the conventional TDD operations, the simultaneous existence of downlink and uplink (i.e., full duplex) or more specifically, subband non-overlapping full duplex is implemented at the BS (e.g., gNB) side within a conventional TDD band. The subband non-overlapping full duplex cannot be supported by the conventional TDD frame structures. In the examples in which full duplex is supported, the uplink and downlink configurations of neighbor cells may differ.

Figure 1:
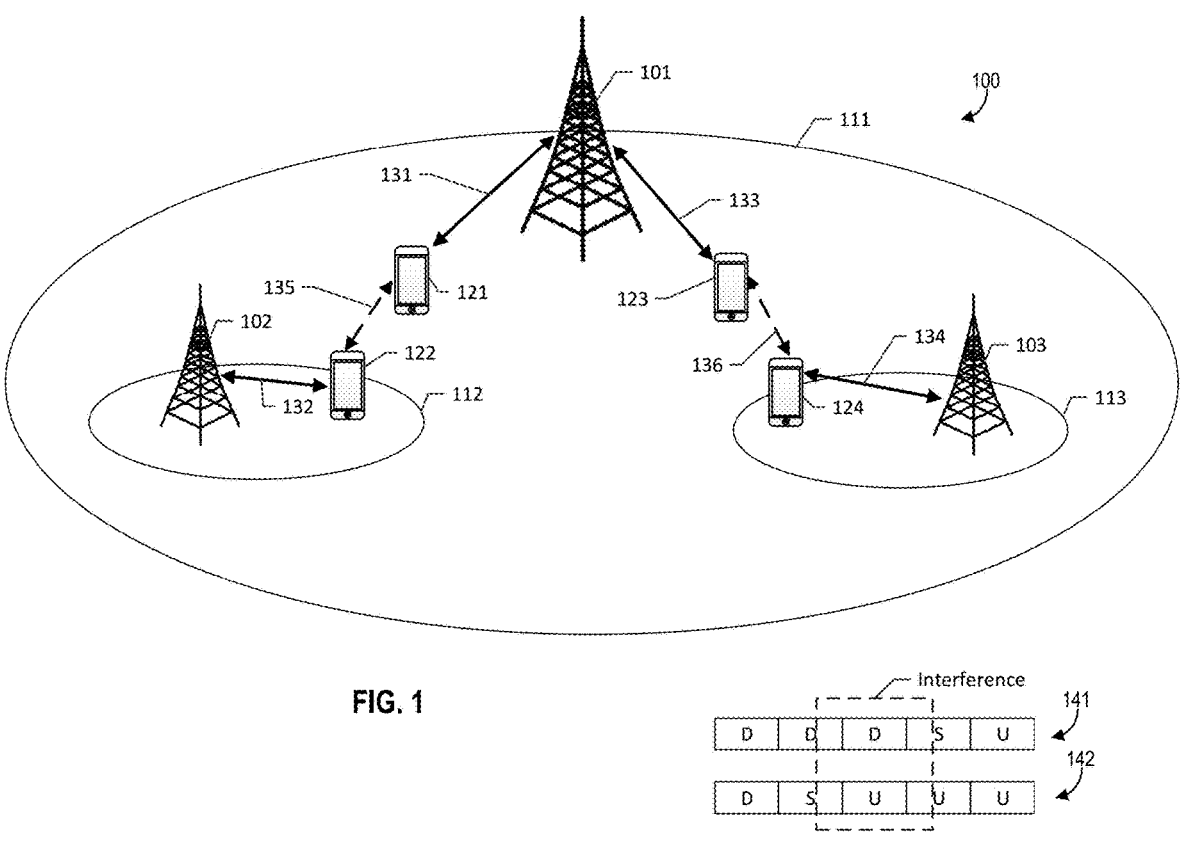
FIG. 1 illustrates an example wireless communication system, according to various arrangements.

FIG. 1 is an example wireless communication system 100, according to various arrangements. As shown in FIG. 1, the system 100 includes a BS 101, a BS 102, and a BS 103. Each BS 101, 102, or 103 can be a wireless communication node such as but not limited to, a gNB, eNB, an access point, a Transmission/Reception Point (TRP), or so on. Each BS 101, 102, or 103 provides wireless communication services and can communicate with (send data, signals, or messages to and receive data, signals, or messages from) wireless communication devices (e.g., UEs 121, 122, 123, and 124) within a geographical boundary defined by the transmission and reception capabilities of each BS 101, 102, or 103 and the wireless communication devices with in such geographical boundary. The area defined by the geographical boundary is referred to as a cell. As shown, the BS 101 provides wireless communication services within a cell 111. The BS 102 provides wireless communication services within a cell 112. The BS 103 provides wireless communication services within a cell 113.

The UEs 121 and 123 are within the cell 111 and are communicating with the BS 101 via respective links (or connections) 131 and 133 as shown. The links 131 and 132 support uplink communications which include wireless transfer of data from the UEs 121 and 123 to the BS 101 and downlink communications which include wireless transfer of data from the BS 101 to the UEs 121 and 123. The UE 122 is within the cell 112 and is communicating with the BS 102 via link (or connection) 132 as shown. The link 132 supports uplink communications which include wireless transfer of data from the UE 122 to the BS 102 and downlink communications which include wireless transfer of data from the BS 102 to the UE 122. The UE 124 is within the cell 113 and is communicating with the BS 103 via link (or connection) 134 as shown. The link 134 supports uplink communications which include wireless transfer of data from the UE 124 to the BS 103 and downlink communications which include wireless transfer of data from the BS 103 to the UE 124.

In some examples, the term "network" refers to one or more BSs (e.g., the BS 101, 102, and 103) that are in communication with the UEs 121, 122, 123, and 124, as well as backend entities and functions (e.g., a Location Management Function (LMF)). In other words, the "network" refers to components of the system 100 other than the UEs 121, 122, 123, and 124.

As shown, the cell 111 has an area that includes/overlaps with or adjacent to areas defined by the cells 112 and 113, due to the locations of the BS 101, 102, and 103 as well as the transmission and reception reach of the BS 101 being configured to be greater than those of the BS 102 and 103. In some implementations, the cell 111 can be a macro cell and the cells 112 and 113 are micro cells.

To increase the uplink service capacity for the UEs 122 and 124, the micro cells 112 and 113 (e.g., the BS 102 and 103) configure more uplink resources for the entire bandwidth or for some sub-bands. As shown, the UE 121 or 123 communicating with the BS 101 may be using the frame structure 141, and the UE 122 communicating with the BS 102 may be using the frame structure 142. The frame structure 142 includes more uplink resources (denoted as "U") than those of the frame structure 141. Downlink resources are denoted as "D," and special or flexible resources are denoted as "S." Each downlink resource, uplink resource, or special/flexible resource can be an frame, subframe, slot, symbol, or so on.

In this scenario, cross-link interference may exist among the time-frequency resources of the macro cell 111 and the micro cell 112 or 113 given that they have different frame structures (e.g., different attributes thereof). Specifically, the uplink transmission of the UE 122 in the micro cell 112 (and communicating with the BS 102) can interfere with the downlink reception of the UE 121 in the macro cell 111 (and communicating with the BS 101). Similarly, the uplink transmission of the UE 124 in the micro cell 113 (and communicating with the BS 103) can interfere with the downlink reception of the UE 123 in the macro cell 111 (and communicating with the BS 101). Such interference relationship between the UEs 121 and 122 is denoted as 135, and the interference relationship between the UEs 123 and 124 is denoted as 136. The uplink-to-downlink interference can also be referred to as inter-UE interference.

Similarly, downlink transmission of the BS 101 in the macro cell 111 also interferes with the uplink reception of the BS 102 or 103 in the micro cell 112 or 113. Such downlink-to-uplink interference can also be referred to as inter-BS interference.

Figure 2:
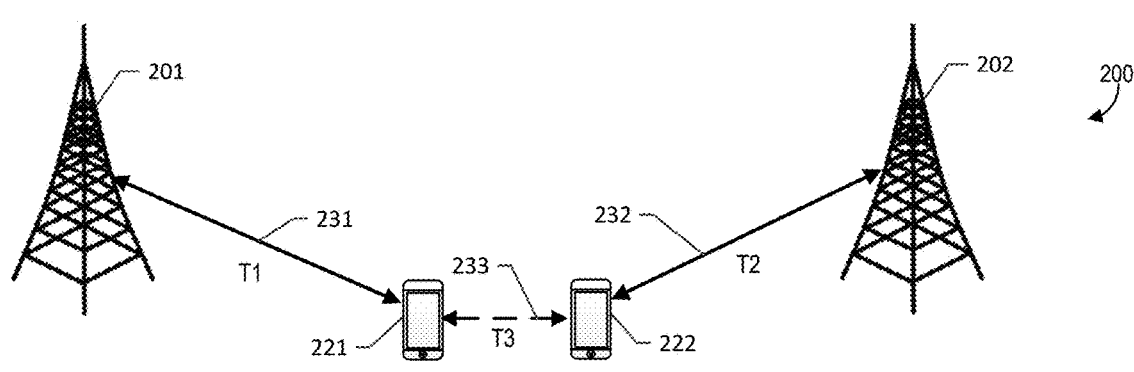
FIG. 2 is an example wireless communication system, according to various arrangements.

FIG. 2 is an example wireless communication system 200, according to various arrangements. As shown in FIG. 2, the system 200 includes a BS 201 and a BS 202. Each BS 201 and 202 can be a wireless communication node such as but not limited to, a gNB, eNB, an access point, a TRP, or so on. Each BS 201 or 202 provides wireless communication services and can communicate with (send data, signals, or messages to and receive data, signals, or messages from) wireless communication devices (e.g., UE 221 or 222) within a geographical boundary defined by the transmission and reception capabilities of each BS 201 or 202 and the wireless communication devices with in such geographical boundary. The area defined by the geographical boundary is referred to as a cell, which is not shown. In some examples, the cell corresponding to the BS 201 may overlap with or include at least a portion of the cell corresponding to the BS 202, vice versa. In other examples, the cell corresponding to the BS 201 and the cell corresponding to the BS 202 are adjacent to one another with no or insignificant overlap in area.

The UE 221 is within the cell associated with the BS 201 and is communicating with the BS 201 via link (or connection) 231 as shown. The link 231 supports uplink communications which include wireless transfer of data from the UE 221 to the BS 201 and downlink communications which include wireless transfer of data from the BS 201 to the UE 221. The UE 222 is within the cell associated with the BS 202 and is communicating with the BS 202 via link (or connection) 232 as shown. The link 232 supports uplink communications which include wireless transfer of data from the UE 222 to the BS 202 and downlink communications which include wireless transfer of data from the BS 202 to the UE 222.

In some examples, the UEs 221 and 222 are located at the edges of the two adjacent cells (associated with the BS 201 and 202) and are close to each other. The time-frequency-domain resources for these cells and the BS 201 and 202 have different frame structures or attributes thereof. For instance, the time-frequency-domain resource (e.g., a frame, a subframe, a slot, and so on) for the cell associated with BS 201 is for uplink transmission while at the same time, the time-frequency-domain resource for the cell associated with BS 202 is for downlink transmission. During the time at which the time-frequency-domain resources for the different cells are different, crosslink interference 233 may be generated. Specifically for example, the uplink transmission of the UE 221 communicating with the BS 201 via link 231 interferes with the downlink reception of the UE 222 communicating with BS 202 via link 232. When the uplink transmissions of a UE interfere with the downlink reception of another UE, it is referred to called inter-UE interference or UE-to-UE interference. When the downlink transmission of the BS 202 interferes with the uplink reception of the BS 201, it is downlink transmission of a BS interfering with the uplink reception of another BS, which is referred to as inter-BS interference, BS-to-BS interference, or TRP-to-TRP interference.

The FIG. 2 also shows the transmission delay of communications between different network nodes. As shown, T1 is required for transmitting a signal between BS 201 and UE 221, via the link 231. T2 is required for transmitting a signal between BS 202 and UE 222, via the link 232. Further, T3 is required for transmitting a signal between UE 221 and UE 222, for example, for the interference 233.

Downlink/uplink timing determination refers to determining time-domain position for signal transmission/reception. The time-domain position includes at least one of a symbol border, a slot border, a subframe border, a half-frame border, a frame border, and so on. The transmission and reception timing of different network nodes can be determined using various methods.

Figure 3:
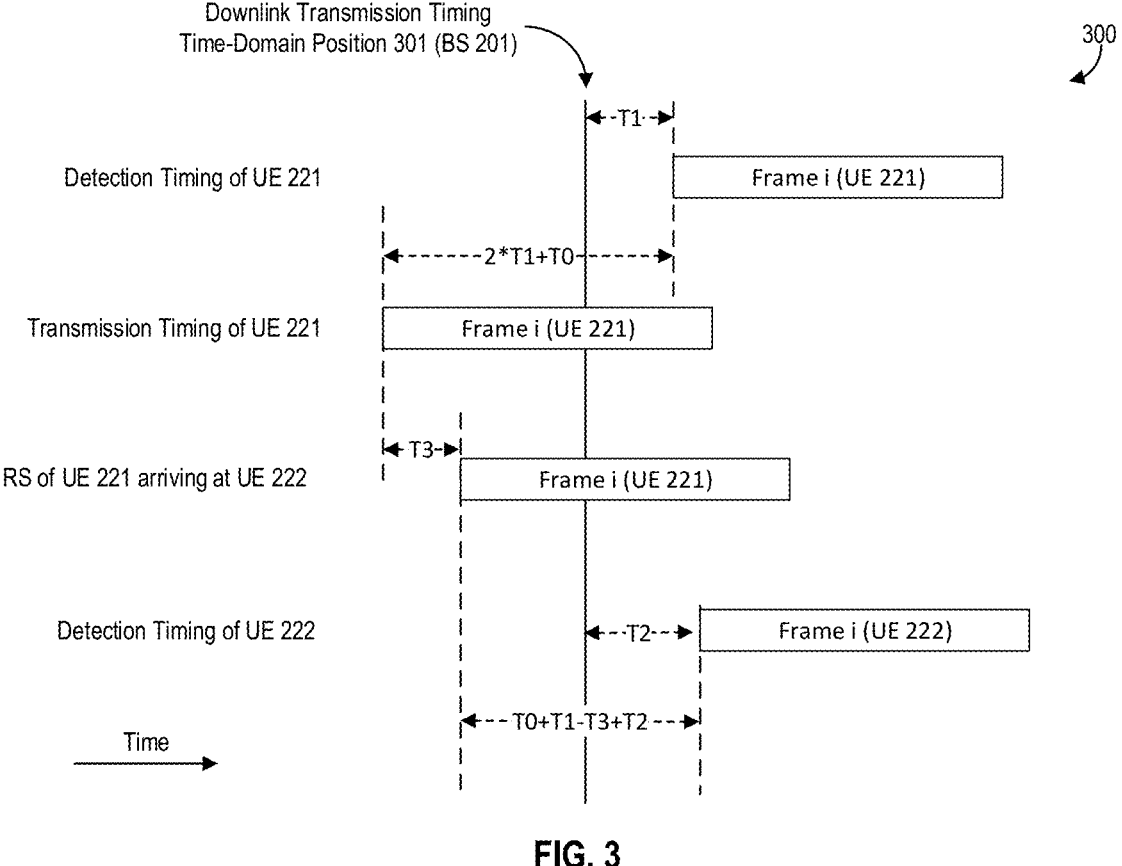
FIG. 3 is a diagram illustrating time-domain positions for signal transmission/reception for inter-UE interference, according to various arrangements.

FIG. 3 is a diagram illustrating time-domain positions for signal transmission/reception, according to various arrangements. For example, the vertical solid line in FIG. 3 denotes the time-domain position 301 (e.g., a frame border) of the BS 201 for transmitting data, which is the downlink transmission timing of data in frame i. In some examples, the transmission timing of different BS (which can also be referred to as downlink transmission timing) is aligned with each other. The reception or detection timing of frame i by the UE 221 (which is also referred to as downlink reception timing of UE 221) is T1 after the downlink transmission timing time-domain position 301. The transmission timing of frame i by UE 221 (which is also referred to as uplink transmission timing) is 2*T1+T0 before the detection timing of the UE 221 or T1+T0 before the downlink transmission timing of the BS 201. T0 is parameter that is configured by the BS 201 through Radio Resource Control (RRC) signaling e.g., n-TimingAdvanceOffset (from value set, e.g., {n0, n25600, n39936}). Such RRC signaling can be used for state transition of the BS 201 between reception and transmission. When RRC is not configured, the default values in Table 400 shown in FIG. 4 are used.

To measure UE 221 to UE 222 interference, UE 221 (e.g., the aggressor UE or interfering UE) sends the measurement Reference Signal (RS) such as Cross Link Interference (CLI) RS for UE 222 measurement. If UE 221 transmits the RS according to the normal uplink transmission timing determined above, UE 222 (e.g., the victim UE or interfered UE) receives the RS (frame i) at a time point which is T3 after the uplink transmission timing of UE 221. According to conventional methods, the reception or detection timing of UE 222 is T2 after the downlink transmission timing of time-domain position 301 of BS 201.

There will be a time gap between reception of the RS and normal downlink reception timing of UE 222, and which is defined by T0+T1−T3+T2. This affects the reliability of UE 222 in measuring the reference signal sent by UE 221.

The various arrangements disclosed herein improve measurement reliability and set forth methods for adjusting the transmitting or receiving timing to obtain higher measurement performance.

Figure 5:
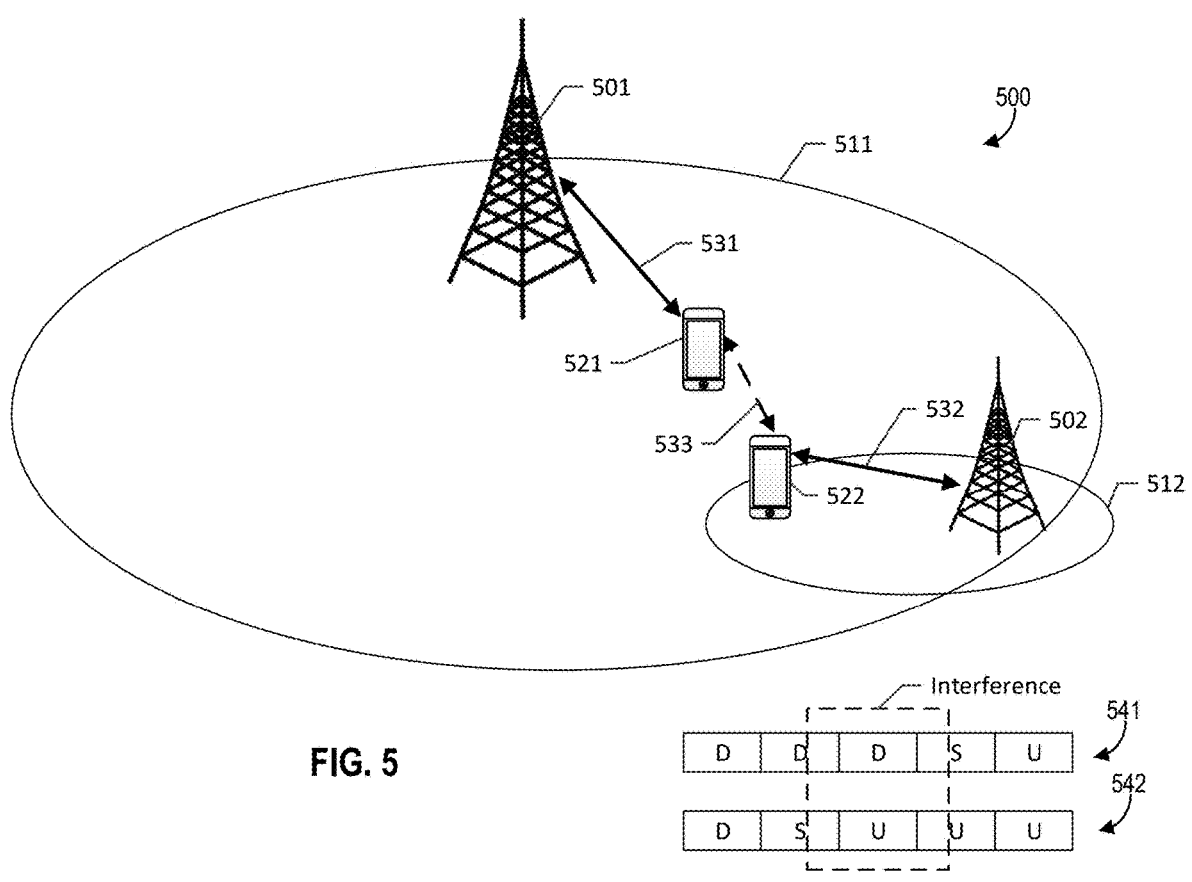
FIG. 5 is an example wireless communication system, according to various arrangements.

Some arrangements relate to transmission and reception timing determination for RS transmission for inter-UE interference measurement. FIG. 5 is an example wireless communication system 500, according to various arrangements. As shown in FIG. 5, the system 500 includes a BS 501 and a BS 502. Each BS 501 and 502 can be a wireless communication node such as but not limited to, a gNB, eNB, an access point, a TRP, or so on. Each BS 501 or 502 provides wireless communication services and can communicate with (send data, signals, or messages to and receive data, signals, or messages from) wireless communication devices (e.g., UE 521 or 522) within a geographical boundary defined by the transmission and reception capabilities of each BS 501 or 502 and the wireless communication devices with in such geographical boundary. The area defined by the geographical boundary is referred to as a cell. As shown, the BS 501 provides wireless communication services within a cell 511. The BS 502 provides wireless communication services within a cell 512. In some examples as shown, the cell 511 may overlap with or include at least a portion of the cell 512, vice versa. In other examples, the cell 511 and the cell 512 are adjacent to one another with no or insignificant overlap in area.

The UE 521 is within the cell 511 and is communicating with the BS 501 via link (or connection) 531 as shown. The link 531 supports uplink communications which include wireless transfer of data from the UE 521 to the BS 501 and downlink communications which include wireless transfer of data from the BS 501 to the UE 521. The UE 522 is within the cell 512 and is communicating with the BS 502 via link (or connection) 532 as shown. The link 532 supports uplink communications which include wireless transfer of data from the UE 522 to the BS 502 and downlink communications which include wireless transfer of data from the BS 502 to the UE 522.

The UEs 521 and 522 are sufficiently close to cause interference denoted as 533 to one another. To increase the uplink service capacity for the UE 522, the micro cell 512 (e.g., the BS 502) configures more uplink resources for the entire bandwidth or for some sub-bands. As shown, the UE 521 communicating with the BS 501 may be using the frame structure 541, and the UE 522 communicating with the BS 502 may be using the frame structure 542. The frame structure 542 includes more uplink resources (denoted as "U") than those of the frame structure 141. Downlink resources are denoted as "D," and special/flexible resources are denoted as "S." Each downlink resource, uplink resource, or special/flexible resource can be an frame, subframe, slot, or so on.

The interference or aggressor UE 522 (second UE or second network node) transmits RS for inter-UE interference measurement according to its uplink transmission timing of normal uplink data, e.g., carried on Physical Uplink Shared Channel (PUSCH), Physical Uplink Control Channel (PUCCH), etc. The victim UE 521 (first UE or first network node) receives and measures the RS.

The time-domain resources (shown in dotted box) may be configured with different frame structure attributes (i.e., uplink in cell 512 while downlink in cell 511). The UE 522 and BS 502 are located in cell 512, while UE 521 and BS 501 are located in cell 511. Then, within these resources, the uplink transmission of UE 522 interferes the downlink reception at UE 521. UE 522 transmits RS according to its uplink transmission timing as normal data. UE 521 measures the RS from UE 522, and its reception timing for measuring the RS is different from its downlink reception timing for the normal downlink data, where the downlink reception timing for the normal downlink data corresponds to the uplink transmission timing. In some arrangements, the determined transmission timing is uplink transmission timing of normal uplink data. The reception timing at the first network node is different from downlink reception or detection timing of the normal downlink data.

More specifically, the victim UE 521 determines the reception timing of the measurement RS using at least one of the following parameters: 1) the unidirectional transmission time between aggressor UE 522 (or the UE transmitting the measurement RS) and the BS 502 of the aggressor UE 522, 2) the distance between aggressor UE 522 and the BS 502 of the aggressor UE 522, 3) cell radius of the cell 512 in which aggressor UE 522 is located, 4) $N_{TA\ offset}$ of the cell 512 in which aggressor UE 522 is located, 5) unidirectional transmission time between victim UE 521 (or the UE receiving the measurement RS) and BS 501 of the victim UE 521, and 6) the maximum transmission delay or the reference transmission delay between aggressor UE 522 and victim UE 521. As used herein, $N_{TA\ offset}$ refers to an offset configured by a BS of a cell for adjusting the value of transmission timing adjustments (TA). In some arrangements, the $N_{TA\ offset}$ is used for state transition of the BS between reception and transmission. In some arrangements, the reception timing of the RS is determined according to at least one of: a unidirectional transmission time between the second network node and a base station communicating with the second network node; a distance between the second network node and the base station communicating with the second network node; a cell radius of a cell of the base station in which the second network node is located; $N_{TA\ offset}$ (e.g., time advance (TA) offset) of the cell of the base station in which the second network node is located; a unidirectional transmission time between the first network node a base station communicating with the first network node; and a maximum transmission delay or a reference transmission delay between the first network node and the second network node.

The victim UE 521 can receive such parameters configured by BS 501 via RRC signaling from BS 501. Alternately, the victim UE 521 can receive such parameters from the BS 502 directly. For example, the UE 521 can receive system information from BS 502 (base station communicating with the aggressor UE 522). In some examples, such parameters can also be transmitted from BS 502 to BS 501, and BS 501 further indicates at least part of parameters to the victim UE 521. In some arrangements, determining the reception timing of the RS includes receiving, by the first network node, at least one parameter from a base station communicating with the first network node or a base station communicating with the second network node and determining, by the first network node, the reception timing of the RS according to the at least one of parameter.

Then, victim UE 521 can determine the reception timing for the measurement RS as a time period T0+T1−T3+T2 before its normal reception or detection timing for normal downlink data (e.g., PDSCH, PDCCH, etc.). Alternately, the victim UE 521 can determine the reception timing for the measurement RS as T0−T3+T2 before downlink transmission timing.

In some arrangements, T0 is $N_{TA\ offset}$ of the cell 512 which aggressor UE 522 is located. T2 is the unidirectional transmission time between the victim UE 521 (the UE which receive the measurement RS) and the BS 501 communicating with the victim UE 521. T1 is determined based on one of unidirectional transmission time between aggressor UE 522 (the UE which transmitting the measurement RS) and the BS 502 communicating with the aggressor UE 522, or transmission time calculated according to the distance between the aggressor UE 522 and the BS 502 communicating with the aggressor UE 522, or the cell radius of the cell which aggressor the UE 522 is located. T3 is transmission delay (e.g., a maximum transmission delay or a reference transmission delay) between the aggressor UE 522 and the victim UE 521. In some examples in which the UEs 522 and 521 are sufficiently closed to each other (e.g., less than a predetermined distance such as 50 m, 20 m, 10 m, or so on, T3 can be assumed as 0.

In some arrangements, the reception timing of the RS is determined as a time period before downlink reception or detection timing for normal downlink data, wherein the time period is calculated as T0+T1−T3+T2. T0 includes $N_{TA\ offset}$ of the cell of the base station in which the second network node is located. T1 includes one of the unidirectional transmission time between the second network node and the base station communicating with the second network node; a transmission time determined according to the distance between the second network node and the base station communicating with the second network node; or the cell radius of a cell of the base station in which the second network node is located. T2 includes the unidirectional transmission time between the first network node the base station communicating with the first network node. T3 includes the maximum transmission delay or the reference transmission delay between the first network node and the second network node.

In some arrangements, the reception timing of the RS is determined as a time period before downlink transmission timing of the base station communicating with the first network node, wherein the time period is calculated as T0−T3+T2. T0 includes $N_{TA\ offset}$ of the cell of the base station in which the second network node is located. T2 includes the unidirectional transmission time between the first network node the base station communicating with the first network node. T3 includes the maximum transmission delay or the reference transmission delay between the first network node and the second network node.

Accordingly, the aggressor UE 522 can determine the transmission timing of the measurement RS, and the victim UE 511 (interfered UE/measured UE) can determine the receiving timing of the measurement RS accurately, thus effectively improving the performance of the measurement related to the measurement RS for inter-UE interference.

Some arrangements relate to transmission and reception timing determination for RS transmission for inter-UE interference measurement. For example, the victim UE 511 receives the RS for inter-UE interference measurement according to its downlink reception timing of normal downlink data, e.g., carried on PDSCH, PDCCH, etc. In some arrangements, the reception timing is downlink reception timing of normal downlink data. The transmission timing is different from uplink transmission timing of the normal uplink data.

As shown in FIG. 5 as described herein, for the two neighboring cell with different frame structure configurations (e.g., frame structures 541 and 542), the time-domain resources (shown in dotted box) may be configured with different frame structure attributes (i.e., uplink in cell 512 while downlink in cell 511). The UE 522 and BS 502 are located in cell 512, while UE 521 and BS 501 are located in cell 511. Then, within these resources, the uplink transmission of UE 522 interferes the downlink reception at UE 521. To measure RS reception by victim UE 521, in order for downlink reception time the same as the conventional downlink reception timing, the aggressor UE 522 transmits the RS using an uplink transmission timing different from that of the uplink transmission timing of normal uplink data carried on PUSCH, PUCCH, etc.

More specifically, the aggressor UE 522 determines the transmission timing of the measurement RS using at least one of the following parameters: 1) the unidirectional transmission time between aggressor UE 522 (or the UE transmitting the measurement RS) and the BS 502 of the aggressor UE 522, 2) the distance between victim UE 521 and the BS 501 of the victim UE 521, 3) transmission time between the BS 501 communicating with the victim UE 521 and the BS 502 communicating with the aggressor UE 522, 4) a distance between the BS 501 communicating with the victim UE 521 and the BS 502 communicating with the aggressor UE 522, 5) $N_{TA\ offset}$ of the cell 512 in which aggressor UE 522 is located, 6) unidirectional transmission time between victim UE 521 (or the UE receiving the measurement RS) and BS 501 of the victim UE 521, and 7) the maximum transmission delay or the reference transmission delay between aggressor UE 522 and victim UE 521. In some arrangements, the transmission timing of the RS is determined by the second network node according to at least one of: a unidirectional transmission time between the second network node and a base station communicating with the second network node; a distance between the first network node and a base station communicating with the first network node; a transmission time between the base station communicating with the first communication node and the base station communicating with the second communication node; a distance between the base station communicating with the first communication node and the base station communicating with the second communication node; $N_{TA\ offset}$ of the cell of the base station in which the second network node is located; a unidirectional transmission time between the first network node a base station communicating with the first network node; and a maximum transmission delay or a reference transmission delay between the first network node and the second network node.

The aggressor UE 522 can receive such parameters configured by BS 502 via RRC signaling from BS 502. Alternately, the aggressor UE 522 can receive such parameters from the BS 501 directly. For example, the aggressor UE 522 can receive system information from BS 501 (base station communicating with the victim UE 521). In some examples, such parameters can also be transmitted from BS 501 to BS 502, and BS 502 further indicates those parameters to the aggressor UE 522.

Figure 6A:
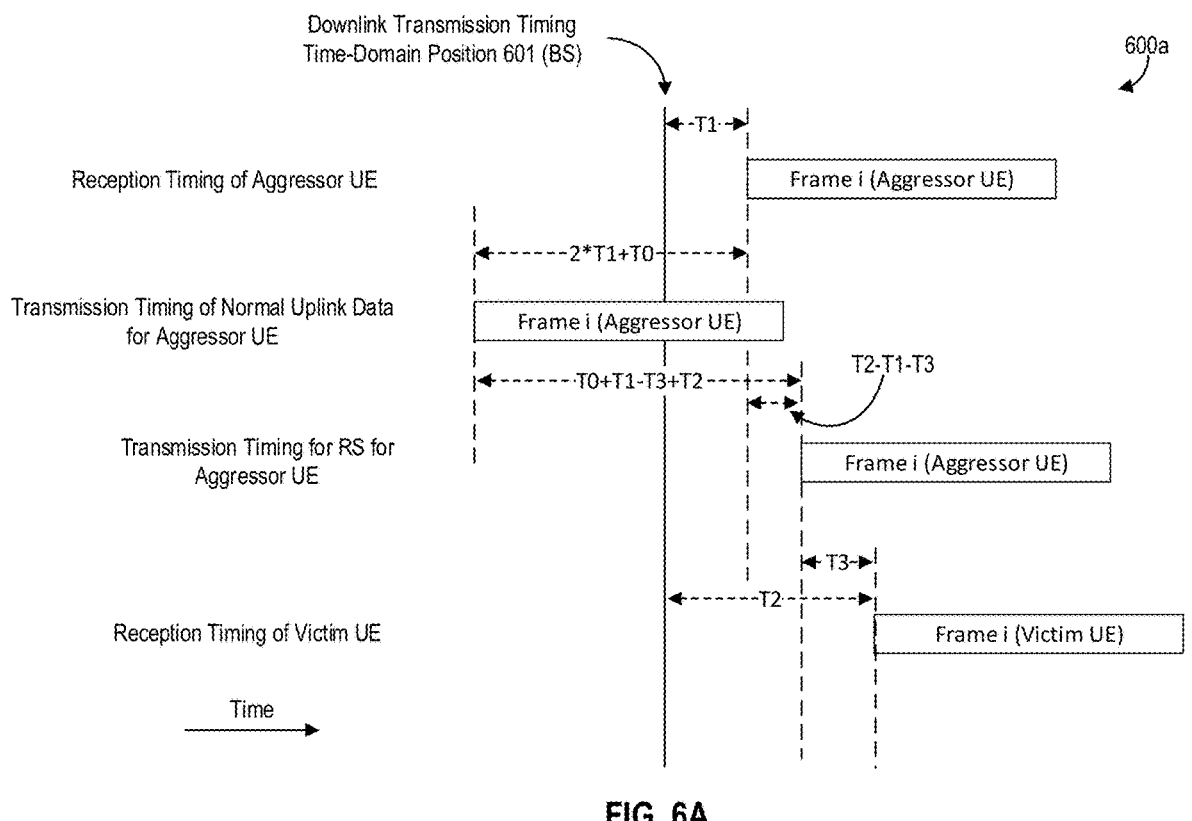
FIG. 6A is a diagram illustrating time-domain positions for signal transmission/reception for inter-UE interference, according to various arrangements.
Figure 6B:
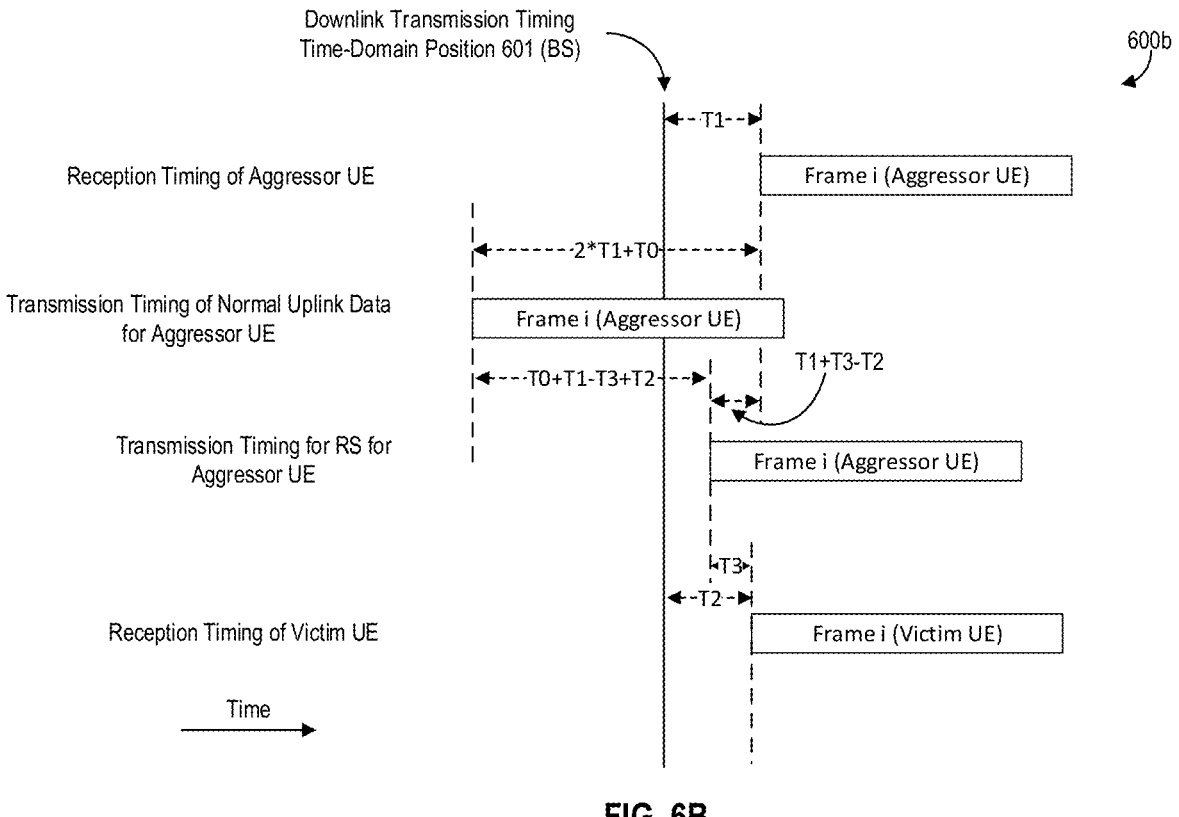
FIG. 6B is a diagram illustrating time-domain positions for signal transmission/reception for inter-UE interference, according to various arrangements.

FIGS. 6A and 6B are diagrams illustrating time-domain positions for signal transmission/reception, according to various arrangements. For example, the vertical solid line in FIG. 3 denotes the time-domain position 301 (e.g., a frame border) of the BS 502 for transmitting data, which is the downlink transmission timing of data in frame i. The reception timing for receiving the downlink transmission in frame i at the aggressor UE 522 is also shown in FIGS. 6A and 6B. In some examples, the transmission timing of different BS (which can also be referred to as downlink transmission timing) is aligned with each other. The downlink reception timing of victim UE 521 for normal downlink data is shown in FIGS. 6A and 6B for the frame i. The aggressor UE 522 transmits the RS for the frame i at the uplink transmission time as shown in FIGS. 6A and 6B in order for the victim UE 521 to receive the RS at the downlink reception time for the normal downlink data. As shown, the transmission timing for the normal uplink data for frame i for the uplink data by the aggressor UE 522 is shown in FIGS. 6A and 6B.

The aggressor UE 522 determines the uplink transmission timing for the measurement RS as a time period T0+T1−T3+T2 after its normal transmission timing for normal uplink data (e.g., PUSCH, PUCCH, etc.) of the aggressor UE 522.

Alternately, in the examples in which T2>T1+T3 (as shown in FIG. 6A), the aggressor UE 522 determines the transmission timing for the measurement RS is T2−T1−T3 after its normal downlink reception timing of the aggressor UE 522.

In the examples in which T2≤T1+T3 (as shown in FIG. 6B), the aggressor UE 522 determines the transmission timing for the measurement RS as T1+T3−T2 before its normal downlink reception timing of the aggressor UE 522.

In some arrangements, T0 is $N_{TA\ offset}$ of the cell 512 which aggressor UE 522 is located. T1 is unidirectional transmission time between aggressor UE 522 (the UE which transmitting the measurement RS) and the BS 502 communicating with the aggressor UE 522. T3 is transmission delay (e.g., a maximum transmission delay or a reference transmission delay) between the aggressor UE 522 and the victim UE 521. In some examples in which the UEs 522 and 521 are sufficiently closed to each other (e.g., less than a predetermined distance such as 50 m, 20 m, 10 m, or so on, T3 can be assumed as 0.

T2 can be determined according to one of the unidirectional transmission time between the victim UE 521 (the UE which receive the measurement RS) and the BS 501 communicating with the victim UE 521, the distance between victim UE 521 and the BS 501 of the victim UE 521, the transmission time between the BS 501 communicating with the victim UE 521 and the BS 502 communicating with the aggressor UE 522, and the distance between the BS 501 communicating with the victim UE 521 and the BS 502 communicating with the aggressor UE 522.

In some arrangements, the reception timing of the RS is determined by the second network node as a time period after uplink transmission timing for normal uplink data, wherein the time period is calculated as T0+T1−T3+T2. T0 includes $N_{TA\ offset}$ of the cell of the base station in which second network node is located. T1 includes the unidirectional transmission time between the second network node and the base station communicating with the second network node. T2 is determined according to one of the unidirectional transmission time between the first network node the base station communicating with the first network node, the distance between the first network node and the base station communicating with the first network node, the transmission time between the base station communicating with the first communication node and the base station communicating with the second communication node, or the distance between the base station communicating with the first communication node and the base station communicating with the second communication node. T3 includes the maximum transmission delay or the reference transmission delay between the first network node and the second network node.

In some arrangements, the reception timing of the RS is determined by the second network node as a time period after downlink reception timing for normal downlink data, wherein the time period is calculated as T2−T1−T3, where T2>T1+T3. T1 includes the unidirectional transmission time between the second network node and the base station communicating with the second network node. T2 is determined according to one of the unidirectional transmission time between the first network node the base station communicating with the first network node, the distance between the first network node and the base station communicating with the first network node, the transmission time between the base station communicating with the first communication node and the base station communicating with the second communication node, or the distance between the base station communicating with the first communication node and the base station communicating with the second communication node. T3 includes the maximum transmission delay or the reference transmission delay between the first network node and the second network node.

In some arrangements, the reception timing of the RS is determined by the second network node as a time period before downlink reception timing for normal downlink data, wherein the time period is calculated as T1+T3−T2, where T2≤T1+T3. T1 includes the unidirectional transmission time between the second network node and the base station communicating with the second network node. T2 is determined according to one of the unidirectional transmission time between the first network node the base station communicating with the first network node, the distance between the first network node and the base station communicating with the first network node, the transmission time between the base station communicating with the first communication node and the base station communicating with the second communication node, or the distance between the base station communicating with the first communication node and the base station communicating with the second communication node. T3 includes the maximum transmission delay or the reference transmission delay between the first network node and the second network node.

Accordingly, the aggressor UE 522 can determine the transmission timing of the measurement RS, and the victim UE 521 can determine the receiving timing of the measurement RS accurately, thus effectively improving the performance of the measurement related to the measurement RS for inter-UE interference.

Some arrangements relate to transmission and reception timing related to RS transmission for inter-UE interference measurement. As described herein, the victim UE 521 determining the reception timing of the RS corresponds to a first mode, and the aggressor UE 522 determining the transmission timing of the RS corresponds to a second mode. In some examples, one or more of the UEs 521 and 522 can determine which one of the first and second modes is to be used based on configurations by the BS 501 and/or BS 502. For instance, at least one of the BS 501 or the BS 502 can transmit to one or more of the UEs 521 and 522 an indication of the mode via RRC signaling, Media Access Control (MAC) layer signaling (e.g., MAC CE), Downlink Control Information (DCI), or some predefined sequence. In some arrangements, the method 1000 further including receiving, by the first network node from a base station, an indication indicating whether the first network node is to determine the reception timing of the RS, wherein the reception timing is different from downlink reception or detection timing of normal downlink data; or the second network node is to determine the transmission timing of the RS, wherein the transmission timing is different from uplink transmission timing of normal uplink data.

In some arrangements, the micro cell 512 can be the victim cell, the UE 522 can be the victim UE 522, the macro cell 511 can be the aggressor cell, and the UE 521 can be the aggressor UE 521. To measure UE 521 to UE 522 interference, UE 521 (e.g., the aggressor UE or interfering UE) sends the measurement RS such as CLI RS for UE 522 measurement. More specifically, the aggressor UE 521 transmits the RS for inter-UE interference measurement according to the uplink transmission timing of normal uplink data, e.g., carried on PUSCH, PUCCH, etc.

As shown in FIG. 5 as described herein, for the two neighboring cell with different frame structure configurations (e.g., frame structures 541 and 542), the time-domain resources (shown in dotted box) may be configured with different frame structure attributes (i.e., uplink in cell 512 while downlink in cell 511). The UE 522 and BS 502 are located in cell 512, while UE 521 and BS 501 are located in cell 511. The aggressor UE 521 communicating with the BS 501 may be using the frame structure 542 in this example, and the victim UE 522 communicating with the BS 502 may be using the frame structure 541. Then, within these resources, the uplink transmission of aggressor UE 521 interferes the downlink reception at victim UE 522. To measure RS reception by victim UE 522, the aggressor UE 521 522 (second UE or second network node) transmits the RS using the uplink transmission timing of normal uplink data carried on PUSCH, PUCCH, etc. The victim UE 522 (first UE or first network node) receives and measures the RS. The reception timing for measuring the RS at the victim UE 522 is different from its downlink reception timing for normal downlink data. In some arrangements, the determined transmission timing is uplink transmission timing of normal uplink data. The reception timing at the first network node is different from downlink reception or detection timing of the normal downlink data.

More specifically, the victim UE 522 determines the reception timing of the measurement RS using at least one of the following parameters: 1) the unidirectional transmission time between aggressor UE 521 (or the UE transmitting the measurement RS) and the BS 501 of the aggressor UE 521, 2) transmission time between the BS 502 communicating with the victim UE 522 and the BS 501 communicating with the aggressor UE 521, 3) the distance between aggressor UE 521 and the BS 501 communicating with the aggressor UE 521, 4) the distance between the BS 502 communicating with the victim UE 522 and the BS 501 communicating with the aggressor UE 521, 5) $N_{TA\ offset}$ of the cell 511 in which aggressor UE 521 is located, 6) unidirectional transmission time between victim UE 522 (or the UE receiving the measurement RS) and BS 502 of the victim UE 522, and 7) the maximum transmission delay or the reference transmission delay between aggressor UE 521 and victim UE 522. In some arrangements, the reception timing of the RS is determined according to at least one of: a unidirectional transmission time between the second network node and a base station communicating with the second network node; a transmission time between the base station communicating with the first communication node and the base station communicating with the second communication node; a distance between the base station communicating with the first communication node and the base station communicating with the second communication node $N_{TA\ offset}$ of the cell of the base station in which the second network node is located; a unidirectional transmission time between the first network node a base station communicating with the first network node; and a maximum transmission delay or a reference transmission delay between the first network node and the second network node.

The victim UE 522 can receive such parameters configured by BS 502 via RRC signaling from BS 502. Alternately, the victim UE 522 can receive such parameters from the BS 501 directly. For example, the UE 522 can receive system information from BS 501 (base station communicating with the aggressor UE 521). In some examples, such parameters can also be transmitted from BS 501 to BS 502, and BS 502 further indicates those parameters to the victim UE 522.

Then, victim UE 522 can determine the reception timing for the measurement RS as a time period T0+T1−T3+T2 before its normal reception or detection timing for normal downlink data (e.g., PDSCH, PDCCH, etc.). Alternately, the victim UE 522 can determine the reception timing for the measurement RS as T0–T3+T2 before downlink transmission timing.

In some arrangements, T0 is $N_{TA\ offset}$ of the cell 511 which aggressor UE 521 is located. T1 is the unidirectional transmission time between the victim UE 522 (the UE which receive the measurement RS) and the BS 502 communicating with the victim UE 522. T2 is determined or calculated according to one of unidirectional transmission time between aggressor UE 521 (the UE which transmitting the measurement RS) and the BS 501 communicating with the aggressor UE 521, or transmission time between the BS 502 communicating with the victim UE 522 and the BS 501 communicating with the aggressor UE 521, or the distance between the aggressor UE 521 and the BS 501 communicating with the aggressor UE 521, or the distance between the BS 502 communicating with the victim UE 502 and the BS 501 communicating with the aggressor UE 531. T3 is transmission delay (e.g., a maximum transmission delay or a reference transmission delay) between the aggressor UE 521 and the victim UE 522. In some examples in which the UEs 521 and 522 are sufficiently closed to each other (e.g., less than a predetermined distance such as 50 m, 20 m, 10 m, or so on, T3 can be assumed as 0.

In some arrangements, the reception timing of the RS is determined as a time period before downlink reception or detection timing for normal downlink data, wherein the time period is calculated as T0+T1–T3+T2. T0 includes $N_{TA\ offset}$ of the cell of the base station in which the second network node is located. T1 includes the unidirectional transmission time between the first network node and the base station communicating with the first network node. T2 is determined according to one of the unidirectional transmission time between the second network node and the base station communicating with the first network node, the transmission time between the base station communicating with the first communication node and the base station communicating with the second communication node, the distance between the second network node and the base station communicating with the second network node, or the distance between the base station communicating with the first communication node and the base station communicating with the second communication node. T3 includes the maximum transmission delay or the reference transmission delay between the first network node and the second network node.

In some arrangements, the reception timing of the RS is determined as a time period before downlink transmission timing of the base station communicating with the first network node, wherein the time period is calculated as T0–T3+T2. T0 includes $N_{TA\ offset}$ of the cell of the base station in which the second network node is located. T2 is determined according to one of the unidirectional transmission time between the second network node and the base station communicating with the first network node, the transmission time between the base station communicating with the first communication node and the base station communicating with the second communication node, the distance between the second network node and the base station communicating with the second network node, or the distance between the base station communicating with the first communication node and the base station communicating with the second communication node. T3 includes the maximum transmission delay or the reference transmission delay between the first network node and the second network node.

Accordingly, the aggressor UE 521 can determine the transmission timing of the measurement RS, and the victim UE 522 can determine the receiving timing of the measurement RS accurately, thus effectively improving the performance of the measurement related to the measurement RS for inter-UE interference.

Some arrangements relate to transmission and reception timing determination for RS transmission for inter-UE interference measurement. For example, the victim UE 512 receives the RS for inter-UE interference measurement according to its downlink reception timing of normal downlink data, e.g., carried on PDSCH, PDCCH, etc. To measure RS reception by victim UE 522, in order for downlink reception time the same as the conventional downlink reception timing, the aggressor UE 521 transmits the RS using an uplink transmission timing different from that of the uplink transmission timing of normal uplink data carried on PUSCH, PUCCH, etc. In some arrangements, the reception timing is downlink reception timing of normal downlink data. The transmission timing is different from uplink transmission timing of the normal uplink data.

More specifically, the aggressor UE 521 determines the transmission timing of the measurement RS using at least one of the following parameters: 1) the unidirectional transmission time between aggressor UE 521 (or the UE transmitting the measurement RS) and the BS 501 of the aggressor UE 521, 2) $N_{TA\ offset}$ of the cell 511 in which aggressor UE 521 is located, 3) unidirectional transmission time between victim UE 522 (or the UE receiving the measurement RS) and BS 502 of the victim UE 522, 4) the distance between victim UE 522 and the BS 502 of the victim UE 522, 5) cell radius of the cell 512 in which victim UE 522 is located, and 6) the maximum transmission delay or the reference transmission delay between aggressor UE 521 and victim UE 522. In some arrangements, the transmission timing of the RS is determined by the second network node according to at least one of: a unidirectional transmission time between the second network node and a base station communicating with the second network node; $N_{TA\ offset}$ of the cell of the base station in which the second network node is located; a unidirectional transmission time between the first network node a base station communicating with the first network node; a distance between the first network node and a base station communicating with the first network node; a cell radius of a cell of the base station in which the first network node is located; and a maximum transmission delay or a reference transmission delay between the first network node and the second network node.

The aggressor UE 521 determines the uplink transmission timing for the measurement RS as a time period T0+T1–T3+T2 after its normal transmission timing for normal uplink data (e.g., PUSCH, PUCCH, etc.) of the aggressor UE 521.

Alternately, in the examples in which T2>T1+T3 (as shown in FIG. 6A), the aggressor UE 521 determines the transmission timing for the measurement RS is T2–T1–T3 after its normal downlink reception timing of normal downlink data for the aggressor UE 521.

In the examples in which T2≤T1+T3 (as shown in FIG. 6B), the aggressor UE 521 determines the transmission timing for the measurement RS as T1+T3–T2 before its normal downlink reception timing of the aggressor UE 521.

In some arrangements, T0 is $N_{TA\ offset}$ of the cell 511 which aggressor UE 521 is located. T1 is unidirectional transmission time between aggressor UE 521 (the UE which transmitting the measurement RS) and the BS 501 communicating with the aggressor UE 521. T3 is transmission delay (e.g., a maximum transmission delay or a reference transmission delay) between the aggressor UE 521 and the victim UE 522. In some examples in which the UEs 522 and 521 are sufficiently closed to each other (e.g., less than a predetermined distance such as 50 m, 20 m, 10 m, or so on, T3 can be assumed as 0.

T2 can be determined according to one of the unidirectional transmission time between the victim UE 522 (the UE which receive the measurement RS) and the BS 502 communicating with the victim UE 522, the distance between victim UE 522 and the BS 502 of the victim UE 521, or the cell radius of the cell 512 in which the victim UE 522 is located.

In some arrangements, the reception timing of the RS is determined by the second network node as a time period after uplink transmission timing for normal uplink data, wherein the time period is calculated as T0+T1−T3+T2. T0 includes $N_{TA\_offset}$ of the cell of the base station in which the second network node is located. T1 includes the unidirectional transmission time between the second network node and the base station communicating with the second network node. T2 is determined according to one of the unidirectional transmission time between the first network node the base station communicating with the first network node, the distance between the first network node and the base station communicating with the first network node, or the cell radius of the cell of the base station in which the first network node is located. T3 includes the maximum transmission delay or the reference transmission delay between the first network node and the second network node.

In some arrangements, the reception timing of the RS is determined by the second network node as a time period after downlink reception timing for normal downlink data, wherein the time period is calculated as T2−T1−T3, where T2>T1+T3. T1 includes the unidirectional transmission time between the second network node and the base station communicating with the second network node. T2 is determined according to one of the unidirectional transmission time between the first network node the base station communicating with the first network node, the distance between the first network node and the base station communicating with the first network node, or the cell radius of the cell of the base station in which the first network node is located. T3 includes the maximum transmission delay or the reference transmission delay between the first network node and the second network node.

In some arrangements, the reception timing of the RS is determined by the second network node as a time period before downlink reception timing for normal downlink data, wherein the time period is calculated as T1+T3−T2, where T2≤T1+T3. T1 includes the unidirectional transmission time between the second network node and the base station communicating with the second network node. T2 is determined according to one of the unidirectional transmission time between the first network node the base station communicating with the first network node, the distance between the first network node and the base station communicating with the first network node, or the cell radius of the cell of the base station in which the first network node is located. T3 includes the maximum transmission delay or the reference transmission delay between the first network node and the second network node.

As described herein, the victim UE 522 determining the reception timing of the RS corresponds to the first mode, and the aggressor UE 521 determining the transmission timing of the RS corresponds to the second mode. In some examples, one or more of the UEs 521 and 522 can deter-mine which one of the first and second modes is to be used based on configurations by the BS 501 and/or BS 502. For instance, at least one of the BS 501 or the BS 502 can transmit to one or more of the UEs 521 and 522 an indication of the mode via RRC signaling, MAC layer signaling (e.g., MAC CE), DCI, or some predefined sequence. In some arrangements, the method 1000 further including receiving, by the first network node from a base station, an indication indicating whether the first network node is to determine the reception timing of the RS, wherein the reception timing is different from downlink reception or detection timing of normal downlink data; or the second network node is to determine the transmission timing of the RS, wherein the transmission timing is different from uplink transmission timing of normal uplink data.

Accordingly, the aggressor UE 521 can determine the transmission timing of the measurement RS, and the victim UE 522 can determine the receiving timing of the measurement RS accurately, thus effectively improving the performance of the measurement related to the measurement RS for inter-UE interference.

In the scenarios illustrates herein, in addition to inter-UE interference, there may be inter-BS interference. That is, the downlink transmission of BS 501 interferes with the uplink reception of BS 502 in the time-domain resources with different frame structures in the examples in which the cell 512 and UE 522 are the aggressors and the cell 511 and the UE 521 are the victims. In addition, the downlink transmission of BS 502 interferes with the uplink reception of BS 501 in the time-domain resources with different frame structures in the examples in which the cell 512 and UE 522 are the victims and the cell 511 and the UE 521 are the aggressors.

To determine the interference between BS, the aggressor BS sends RS for measurement. The victim BS measures the RS. Timing alignment between the transmission and reception of the RS should be achieved.

Figure 7:
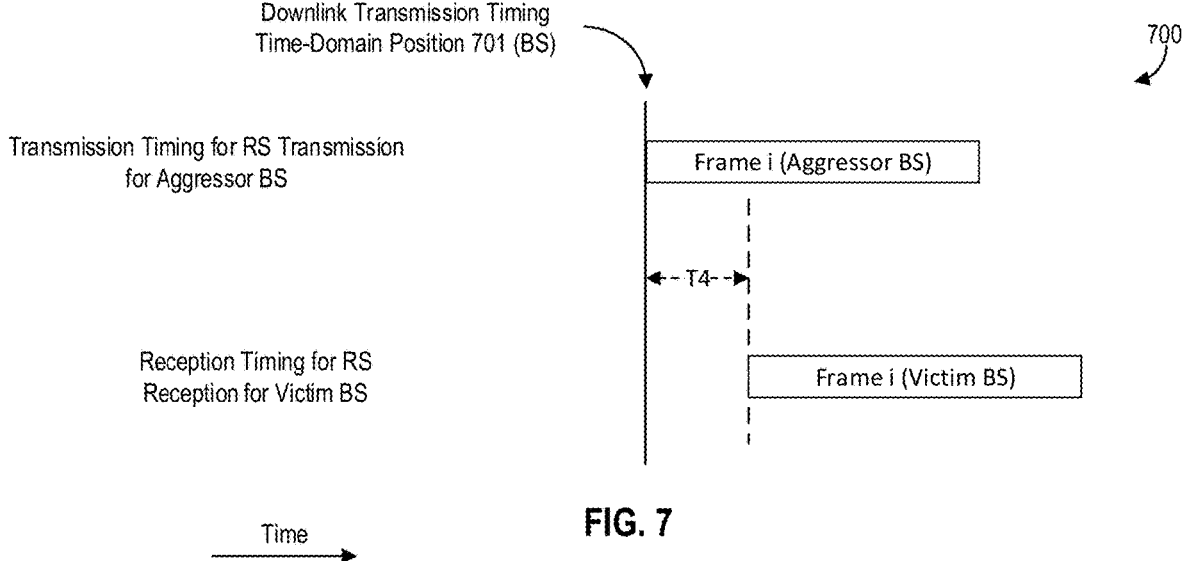
FIG. 7 is a diagram illustrating time-domain positions for signal transmission/reception for inter-BS interference, according to various arrangements.

FIG. 7 is a diagram illustrating time-domain positions for signal transmission/reception for inter-BS interference, according to various arrangements. As shown in FIG. 7, the transmission timing for the measurement RS at aggressor BS can be same as its normal downlink transmission timing, which is at the time-domain position 701. The reception timing of the measurement RS at victim BS is a time duration T4 later than its normal uplink reception timing or normal downlink transmission timing. T4 is the transmission time between the aggressor BS (e.g., the second network node) and the victim BS (e.g., the first network node) or is a time period can be determined is according to distance between the aggressor BS and the victim BS. In some arrangements, the first network node is a first base station. The second network node is a second base station. Operations of the second base station interferes with operations of the first base station.

Figure 8A:
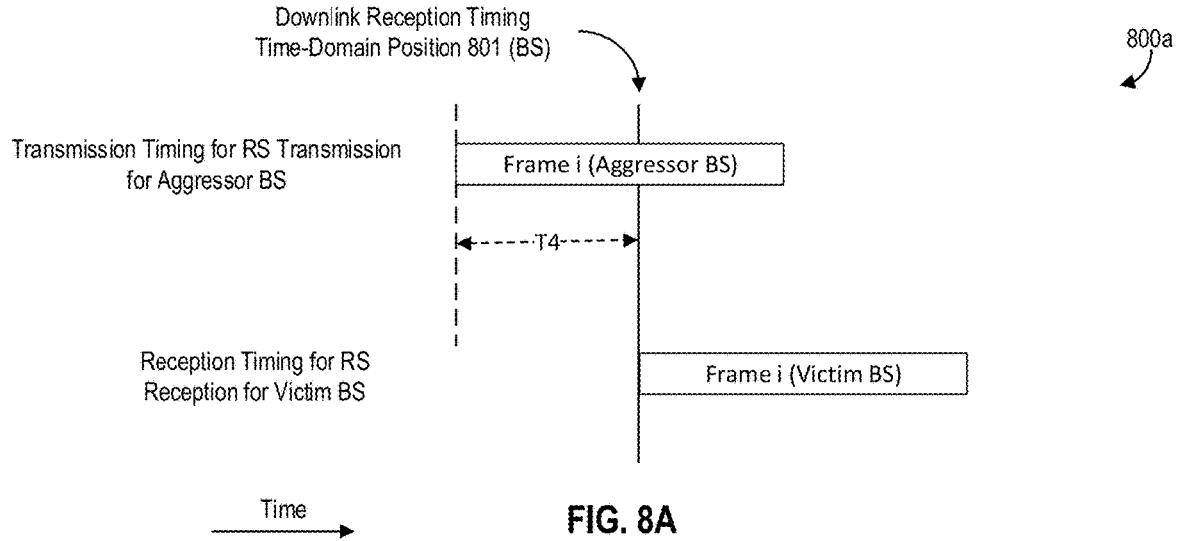
FIG. 8A is a diagram illustrating time-domain positions for signal transmission/reception for inter-BS interference, according to various arrangements.

FIG. 8A is a diagram illustrating time-domain positions for signal transmission/reception for inter-BS interference, according to various arrangements. As shown in FIG. 8A, the transmission timing for the measurement RS at aggressor BS is T4 earlier than the normal downlink transmission timing of normal downlink data. The reception timing of the measurement RS at victim BS can be same as its normal uplink reception timing of normal uplink data. T4 is the transmission time between the aggressor BS (e.g., the second network node) and the victim BS (e.g., the first network node) or is a time period can be determined is according to distance between the aggressor BS and the victim BS. In some arrangements, the reception timing of the RS is a time period later than normal uplink reception timing or normal downlink transmission timing, wherein the time period is determined based on transmission time between the first base station and the second base station or a distance between the first base station and the second base station. The transmission timing is downlink transmission timing of normal downlink data.

Figure 8B:
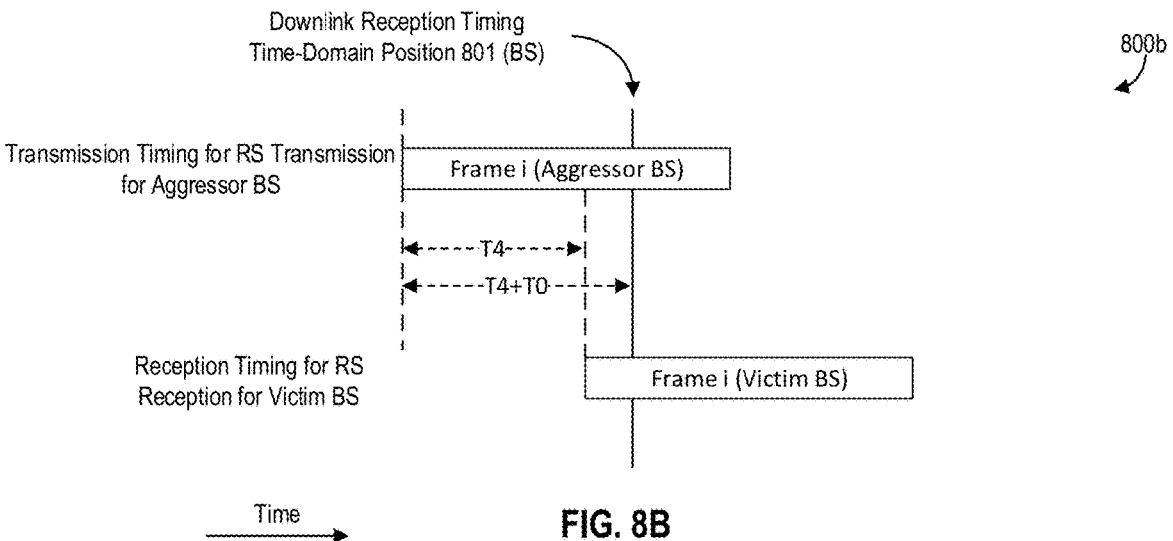
FIG. 8B is a diagram illustrating time-domain positions for signal transmission/reception for inter-BS interference, according to various arrangements.

FIG. 8B is a diagram illustrating time-domain positions for signal transmission/reception for inter-BS interference, according to various arrangements. As shown in FIG. 8B, the transmission timing for the measurement RS at aggressor BS is T4 or T4+T0 earlier than the normal downlink transmission timing of normal downlink data. The reception timing of the measurement RS at victim BS can be same as its normal uplink reception timing of normal uplink data. T0 is $N_{TA\ offset}$ of the cell in which victim BS is located. T4 is the transmission time between the aggressor BS (e.g., the second network node) and the victim BS (e.g., the first network node) or is a time period can be determined is according to distance between the aggressor BS and the victim BS. In some arrangements, the transmission timing of the RS is a time period earlier than normal downlink transmission time of normal downlink data, wherein the time period is determined based on transmission time between the first base station and the second base station or a distance between the first base station and the second base station. The reception timing is uplink reception timing of normal uplink data.

In some arrangements, aligning the transmission to downlink transmission timing and adjust reception timing for the RS corresponds to a first method, and aligning the reception of RS to downlink transmission timing and adjust the transmission timing of the RS corresponds to a second method. The Core Network can determine which method to be used, and transmit the decision to at least one of the aggressor BS and victim BS. Alternatively, one of the BS (e.g., aggressor BS) determines which method to use and transmit the decision to another BS (e.g., victim BS).

Accordingly, the aggressor BS can determine the transmission timing of the measurement RS, and the victim BS can determine the receiving timing of the measurement RS accurately, thus effectively improving the performance of the measurement related to the measurement RS for inter-BS interference.

This disclosure provides for adjusting transmission or reception timing related to RSs for inter-nodes interference measurement. As described herein, the aggressor network node can determine the transmission timing of the measurement RS, and the victim network node can determine the receiving timing of the measurement RS accurately, thus effectively improving the performance of the measurement related to the measurement RS for inter-node interference.

FIG. 9A illustrates a block diagram of an example base station 902 (e.g., the first, second, or third communication node), in accordance with some arrangements of the present disclosure. FIG. 9B illustrates a block diagram of an example UE 901 (e.g., the second communication node), in accordance with some arrangements of the present disclosure. Referring to FIGS. 1-9B, the UE 901 (e.g., a wireless communication device, a terminal, a mobile device, a mobile user, and so on) is an example implementation of the UEs described herein, and the base station 902 is an example implementation of the base station described herein.

The base station 902 and the UE 901 can include components and elements configured to support known or conventional operating features that need not be described in detail herein. In one illustrative arrangement, the base station 902 and the UE 901 can be used to communicate (e.g., transmit and receive) data symbols in a wireless communication environment, as described above. For instance, the base station 902 can be a base station (e.g., gNB, eNB, and so on), a server, a node, or any suitable computing device used to implement various network functions.

The base station 902 includes a transceiver module 910, an antenna 912, a processor module 914, a memory module 916, and a network communication module 918. The module 910, 912, 914, 916, and 918 are operatively coupled to and interconnected with one another via a data communication bus 920. The UE 901 includes a UE transceiver module 930, a UE antenna 932, a UE memory module 934, and a UE processor module 936. The modules 930, 932, 934, and 936 are operatively coupled to and interconnected with one another via a data communication bus 940. The base station 902 communicates with the UE 901 or another base station via a communication channel, which can be any wireless channel or other medium suitable for transmission of data as described herein.

As would be understood by persons of ordinary skill in the art, the base station 902 and the UE 901 can further include any number of modules other than the modules shown in FIGS. 9A and 9B. The various illustrative blocks, modules, circuits, and processing logic described in connection with the arrangements disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The arrangements described herein can be implemented in a suitable manner for each particular application, but any implementation decisions should not be interpreted as limiting the scope of the present disclosure.

In accordance with some arrangements, the UE transceiver 930 includes a radio frequency (RF) transmitter and a RF receiver each including circuitry that is coupled to the antenna 932. A duplex switch (not shown) may alternatively couple the RF transmitter or receiver to the antenna in time duplex fashion. Similarly, in accordance with some arrangements, the transceiver 910 includes an RF transmitter and a RF receiver each having circuitry that is coupled to the antenna 912 or the antenna of another base station. A duplex switch may alternatively couple the RF transmitter or receiver to the antenna 912 in time duplex fashion. The operations of the two-transceiver modules 910 and 930 can be coordinated in time such that the receiver circuitry is coupled to the antenna 932 for reception of transmissions over a wireless transmission link at the same time that the transmitter is coupled to the antenna 912. In some arrangements, there is close time synchronization with a minimal guard time between changes in duplex direction.

The UE transceiver 930 and the transceiver 910 are configured to communicate via the wireless data communication link, and cooperate with a suitably configured RF antenna arrangement 912/932 that can support a particular wireless communication protocol and modulation scheme. In some illustrative arrangements, the UE transceiver 910 and the transceiver 910 are configured to support industry standards such as the Long Term Evolution (LTE) and emerging 5G standards, and the like. It is understood, however, that the present disclosure is not necessarily limited in application to a particular standard and associated protocols. Rather, the UE transceiver 930 and the base station transceiver 910 may be configured to support alternate, or additional, wireless data communication protocols, including future standards or variations thereof.

The transceiver 910 and the transceiver of another base station (such as but not limited to, the transceiver 910) are configured to communicate via a wireless data communication link, and cooperate with a suitably configured RF antenna arrangement that can support a particular wireless communication protocol and modulation scheme. In some illustrative arrangements, the transceiver 910 and the transceiver of another base station are configured to support industry standards such as the LTE and emerging 5G standards, and the like. It is understood, however, that the present disclosure is not necessarily limited in application to a particular standard and associated protocols. Rather, the transceiver 910 and the transceiver of another base station may be configured to support alternate, or additional, wireless data communication protocols, including future standards or variations thereof.

In accordance with various arrangements, the base station 902 may be a base station such as but not limited to, an eNB, a serving eNB, a target eNB, a femto station, or a pico station, for example. The base station 902 can be an RN, a regular, a eNB, or a gNB. In some arrangements, the UE 901 may be embodied in various types of user devices such as a mobile phone, a smart phone, a personal digital assistant (PDA), tablet, laptop computer, wearable computing device, etc. The processor modules 914 and 936 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 914 and 936, respectively, or in any practical combination thereof. The memory modules 916 and 934 may be realized as RAM memory, flash memory, ROM memory, EPROM memory, EEPROM memory, registers, a hard disk, a removable disk, a CD-ROM, or any other form of storage medium known in the art. In this regard, memory modules 916 and 934 may be coupled to the processor modules 910 and 930, respectively, such that the processors modules 910 and 930 can read information from, and write information to, memory modules 916 and 934, respectively. The memory modules 916 and 934 may also be integrated into their respective processor modules 910 and 930. In some arrangements, the memory modules 916 and 934 may each include a cache memory for storing temporary variables or other intermediate information during execution of instructions to be executed by processor modules 910 and 930, respectively. Memory modules 916 and 934 may also each include non-volatile memory for storing instructions to be executed by the processor modules 910 and 930, respectively.

The network communication module 918 generally represents the hardware, software, firmware, processing logic, and/or other components of the base station 902 that enable bi-directional communication between the transceiver 910 and other network components and communication nodes in communication with the base station 902. For example, the network communication module 918 may be configured to support internet or WiMAX traffic. In a deployment, without limitation, the network communication module 918 provides an 802.3 Ethernet interface such that the transceiver 910 can communicate with a conventional Ethernet based computer network. In this manner, the network communication module 918 may include a physical interface for connection to the computer network (e.g., Mobile Switching Center (MSC)). In some arrangements, the network communication module 918 includes a fiber transport connection configured to connect the base station 902 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

FIG. 10 is a flowchart diagram illustrating an example method 1000 for transmitting RS for measuring interference, according to various arrangements. Referring to FIGS. 1-10, the method 1000 can be performed by a first network node (e.g., the victim network node) and a second network node (e.g., the aggressor network node).

At 1010, the second network node determines transmission timing of the RS. At 1020, the first network node determines the reception timing of the RS. At 1030, the second network node transmits the RS according to the determined transmission timing. At 1040, the first network node receives the RS according to the determined reception timing.

In some arrangements, the first network node is a first wireless communication device. The second network node is a second wireless communication device. Operations of the second wireless communication device interferes with operations of the first wireless communication device.

In some arrangements, the determined transmission timing is uplink transmission timing of normal uplink data. The reception timing at the first network node is different from downlink reception or detection timing of the normal downlink data. In some arrangements, the reception timing of the RS is determined according to at least one of: a unidirectional transmission time between the second network node and a base station communicating with the second network node; a distance between the second network node and the base station communicating with the second network node; a cell radius of a cell of the base station in which the second network node is located; $N_{TA\ offset}$ (e.g., time advance (TA) offset) of the cell of the base station in which the second network node is located; a unidirectional transmission time between the first network node a base station communicating with the first network node; and a maximum transmission delay or a reference transmission delay between the first network node and the second network node.

In some arrangements, the reception timing of the RS is determined as a time period before downlink reception or detection timing for normal downlink data, wherein the time period is calculated as $T0+T1-T3+T2$. $T0$ includes $N_{TA\ offset}$ of the cell of the base station in which the second network node is located. $T1$ includes one of the unidirectional transmission time between the second network node and the base station communicating with the second network node; a transmission time determined according to the distance between the second network node and the base station communicating with the second network node; or the cell radius of a cell of the base station in which the second network node is located. T2 includes the unidirectional transmission time between the first network node the base station communicating with the first network node. T3 includes the maximum transmission delay or the reference transmission delay between the first network node and the second network node.

In some arrangements, the reception timing of the RS is determined as a time period before downlink transmission timing of the base station communicating with the first network node, wherein the time period is calculated as T0–T3+T2. T0 includes $N_{TA\ offset}$ of the cell of the base station in which the second network node is located. T2 includes the unidirectional transmission time between the first network node the base station communicating with the first network node. T3 includes the maximum transmission delay or the reference transmission delay between the first network node and the second network node.

In some arrangements, determining the reception timing of the RS includes receiving, by the first network node, at least one parameter from a base station communicating with the first network node or a base station communicating with the second network node and determining, by the first network node, the reception timing of the RS according to the at least one of parameter.

In some arrangements, the reception timing of the RS is determined according to at least one of: a unidirectional transmission time between the second network node and a base station communicating with the second network node; a transmission time between the base station communicating with the first communication node and the base station communicating with the second communication node; a distance between the base station communicating with the first communication node and the base station communicating with the second communication node $N_{TA\ offset}$ of the cell of the base station in which the second network node is located; a unidirectional transmission time between the first network node a base station communicating with the first network node; and a maximum transmission delay or a reference transmission delay between the first network node and the second network node.

In some arrangements, the reception timing of the RS is determined as a time period before downlink reception or detection timing for normal downlink data, wherein the time period is calculated as T0+T1–T3+T2. T0 includes $N_{TA\ offset}$ of the cell of the base station in which the second network node is located. T1 includes the unidirectional transmission time between the first network node and the base station communicating with the first network node. T2 is determined according to one of the unidirectional transmission time between the second network node and the base station communicating with the first network node, the transmission time between the base station communicating with the first communication node and the base station communicating with the second communication node, the distance between the second network node and the base station communicating with the second network node, or the distance between the base station communicating with the first communication node and the base station communicating with the second communication node. T3 includes the maximum transmission delay or the reference transmission delay between the first network node and the second network node.

In some arrangements, the reception timing of the RS is determined as a time period before downlink transmission timing of the base station communicating with the first network node, wherein the time period is calculated as T0–T3+T2. T0 includes $N_{TA\ offset}$ of the cell of the base station in which the second network node is located. T2 is determined according to one of the unidirectional transmission time between the second network node and the base station communicating with the first network node, the transmission time between the base station communicating with the first communication node and the base station communicating with the second communication node, the distance between the second network node and the base station communicating with the second network node, or the distance between the base station communicating with the first communication node and the base station communicating with the second communication node. T3 includes the maximum transmission delay or the reference transmission delay between the first network node and the second network node.

In some arrangements, the reception timing is downlink reception timing of normal downlink data. The transmission timing is different from uplink transmission timing of the normal uplink data.

In some arrangements, the transmission timing of the RS is determined by the second network node according to at least one of: a unidirectional transmission time between the second network node and a base station communicating with the second network node; a distance between the first network node and a base station communicating with the first network node; a transmission time between the base station communicating with the first communication node and the base station communicating with the second communication node; a distance between the base station communicating with the first communication node and the base station communicating with the second communication node; $N_{TA\ offset}$ of the cell of the base station in which the second network node is located; a unidirectional transmission time between the first network node a base station communicating with the first network node; and a maximum transmission delay or a reference transmission delay between the first network node and the second network node.

In some arrangements, the reception timing of the RS is determined by the second network node as a time period after uplink transmission timing for normal uplink data, wherein the time period is calculated as T0+T1–T3+T2. T0 includes $N_{TA\ offset}$ of the cell of the base station in which the second network node is located. T1 includes the unidirectional transmission time between the second network node and the base station communicating with the second network node. T2 is determined according to one of the unidirectional transmission time between the first network node the base station communicating with the first network node, the distance between the first network node and the base station communicating with the first network node, the transmission time between the base station communicating with the first communication node and the base station communicating with the second communication node, or the distance between the base station communicating with the first communication node and the base station communicating with the second communication node. T3 includes the maximum transmission delay or the reference transmission delay between the first network node and the second network node.

In some arrangements, the reception timing of the RS is determined by the second network node as a time period after downlink reception timing for normal downlink data, wherein the time period is calculated as T2–T1–T3, where T2>T1+T3. T1 includes the unidirectional transmission time between the second network node and the base station communicating with the second network node. T2 is determined according to one of the unidirectional transmission time between the first network node the base station communicating with the first network node, the distance between the first network node and the base station communicating with the first network node, the transmission time between the base station communicating with the first communication node and the base station communicating with the second communication node, or the distance between the base station communicating with the first communication node and the base station communicating with the second communication node. T3 includes the maximum transmission delay or the reference transmission delay between the first network node and the second network node.

In some arrangements, the reception timing of the RS is determined by the second network node as a time period before downlink reception timing for normal downlink data, wherein the time period is calculated as T1+T3−T2, where T2≤T1+T3. T1 includes the unidirectional transmission time between the second network node and the base station communicating with the second network node. T2 is determined according to one of the unidirectional transmission time between the first network node the base station communicating with the first network node, the distance between the first network node and the base station communicating with the first network node, the transmission time between the base station communicating with the first communication node and the base station communicating with the second communication node, or the distance between the base station communicating with the first communication node and the base station communicating with the second communication node. T3 includes the maximum transmission delay or the reference transmission delay between the first network node and the second network node.

In some arrangements, the transmission timing of the RS is determined by the second network node according to at least one of: a unidirectional transmission time between the second network node and a base station communicating with the second network node; $N_{TA\ offset}$ of the cell of the base station in which the second network node is located; a unidirectional transmission time between the first network node a base station communicating with the first network node; a distance between the first network node and a base station communicating with the first network node; a cell radius of a cell of the base station in which the first network node is located; and a maximum transmission delay or a reference transmission delay between the first network node and the second network node.

In some arrangements, the reception timing of the RS is determined by the second network node as a time period after uplink transmission timing for normal uplink data, wherein the time period is calculated as T0+T1−T3+T2. T0 includes $N_{TA\ offset}$ of the cell of the base station in which the second network node is located. T1 includes the unidirectional transmission time between the second network node and the base station communicating with the second network node. T2 is determined according to one of the unidirectional transmission time between the first network node the base station communicating with the first network node, the distance between the first network node and the base station communicating with the first network node, or the cell radius of the cell of the base station in which the first network node is located. T3 includes the maximum transmission delay or the reference transmission delay between the first network node and the second network node.

In some arrangements, the reception timing of the RS is determined by the second network node as a time period after downlink reception timing for normal downlink data, wherein the time period is calculated as T2−T1−T3, where T2>T1+T3. T1 includes the unidirectional transmission time between the second network node and the base station communicating with the second network node. T2 is determined according to one of the unidirectional transmission time between the first network node the base station communicating with the first network node, the distance between the first network node and the base station communicating with the first network node, or the cell radius of the cell of the base station in which the first network node is located. T3 includes the maximum transmission delay or the reference transmission delay between the first network node and the second network node.

In some arrangements, the reception timing of the RS is determined by the second network node as a time period before downlink reception timing for normal downlink data, wherein the time period is calculated as T1+T3−T2, where T2≤T1+T3. T1 includes the unidirectional transmission time between the second network node and the base station communicating with the second network node. T2 is determined according to one of the unidirectional transmission time between the first network node the base station communicating with the first network node, the distance between the first network node and the base station communicating with the first network node, or the cell radius of the cell of the base station in which the first network node is located. T3 includes the maximum transmission delay or the reference transmission delay between the first network node and the second network node.

In some arrangements, the method 1000 further including receiving, by the first network node from a base station, an indication indicating whether the first network node is to determine the reception timing of the RS, wherein the reception timing is different from downlink reception or detection timing of normal downlink data; or the second network node is to determine the transmission timing of the RS, wherein the transmission timing is different from uplink transmission timing of normal uplink data.

In some arrangements, the first network node is a first base station. The second network node is a second base station. Operations of the second base station interferes with operations of the first base station.

In some arrangements, the reception timing of the RS is a time period later than normal uplink reception timing or normal downlink transmission timing, wherein the time period is determined based on transmission time between the first base station and the second base station or a distance between the first base station and the second base station. The transmission timing is downlink transmission timing of normal downlink data.

In some arrangements, the transmission timing of the RS is a time period earlier than normal downlink transmission time of normal downlink data, wherein the time period is determined based on transmission time between the first base station and the second base station or a distance between the first base station and the second base station. The reception timing is uplink reception timing of normal uplink data.

In some arrangements, the transmission timing of the RS is a time period earlier than normal downlink transmission time of normal downlink data, wherein the time period is determined based on transmission time between the first base station and the second base station and $N_{TA\ offset}$ of a cell in which first base station; or a distance between the first base station and the second base station. The reception timing is uplink reception timing of normal uplink data.

While various arrangements of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one arrangement can be combined with one or more features of another arrangement described herein. Thus, the breadth and scope of the present disclosure should not be limited by any of the above-described illustrative arrangements.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according arrangements of the present solution.

Additionally, memory or other storage, as well as communication components, may be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:
   determining, by a first network node comprising a first wireless communication device, reception timing of a Reference Signal (RS) according to at least a time for transmitting a signal between the second network node and a base station in which the second network node is located, wherein the time for transmitting the signal is determined based at least in part on a cell radius of a cell of the base station in which the second network node is located, wherein the RS is transmitted by a second network node at transmission timing, wherein the second network node comprises a second wireless communication device;

receiving, by the first network node from the second network node, the RS according to the reception timing; and measuring, by the first network node, the RS to determine interference of the second network node on the first network node.

2. The method of claim 1, wherein operations of the second wireless communication device interferes with operations of the first wireless communication device.

3. The method of claim 1, wherein the transmission timing is uplink transmission timing of uplink data; and the reception timing at the first network node is different from downlink reception or detection timing of downlink data.

4. The method of claim 3, wherein the reception timing of the RS is determined according to at least one of:

a unidirectional transmission time between the second network node and the base station communicating with the second network node;

a distance between the second network node and the base station communicating with the second network node;

$N_{TA\ offset}$ of the cell of the base station in which the second network node is located;

a unidirectional transmission time between the first network node a base station communicating with the first network node; and a maximum transmission delay or a reference transmission delay between the first network node and the second network node.

5. The method of claim 4, wherein the reception timing of the RS is determined as a time period before the downlink reception or detection timing for the normal downlink data, wherein the time period is calculated as $T0+T1-T3+T2$, wherein T0 comprises $N_{TA\ offset}$ of the cell of the base station in which the second network node is located;

T1 comprises one of the unidirectional transmission time between the second network node and the base station communicating with the second network node; a transmission time determined according to the distance between the second network node and the base station communicating with the second network node; or the cell radius of a cell of the base station in which the second network node is located;

T2 comprises the unidirectional transmission time between the first network node the base station communicating with the first network node; and T3 comprises the maximum transmission delay or the reference transmission delay between the first network node and the second network node.

6. The method of claim 4, wherein the reception timing of the RS is determined as a time period before downlink transmission timing of the base station communicating with the first network node, wherein the time period is calculated as $T0-T3+T2$, wherein T0 comprises $N_{TA\ offset}$ of the cell of the base station in which the second network node is located;

T2 comprises the unidirectional transmission time between the first network node the base station communicating with the first network node; and T3 comprises the maximum transmission delay or the reference transmission delay between the first network node and the second network node.

7. The method of claim 3, wherein determining the reception timing of the RS comprises:

receiving, by the first network node, at least one parameter from a base station communicating with the first network node or a base station communicating with the second network node; and determining, by the first network node, the reception timing of the RS according to the at least one of parameter.

8. The method of claim 3, wherein the reception timing of the RS is determined according to at least one of:

a unidirectional transmission time between the second network node and a base station communicating with the second network node;

a transmission time between the base station communicating with the first communication node and the base station communicating with the second communication node;

a distance between the base station communicating with the first communication node and the base station communicating with the second communication node;

$N_{TA\ offset}$ of the cell of the base station in which the second network node is located;

a unidirectional transmission time between the first network node a base station communicating with the first network node; and a maximum transmission delay or a reference transmission delay between the first network node and the second network node.

9. The method of claim 8, wherein the reception timing of the RS is determined as a time period before downlink reception or detection timing for downlink data, wherein the time period is calculated as $T0+T1-T3+T2$, wherein T0 comprises $N_{TA\ offset}$ of the cell of the base station in which the second network node is located;

T1 comprises the unidirectional transmission time between the first network node and the base station communicating with the first network node;

T2 is determined according to one of the unidirectional transmission time between the second network node and the base station communicating with the first network node, the transmission time between the base station communicating with the first communication node and the base station communicating with the second communication node, the distance between the second network node and the base station communicating with the second network node, or the distance between the base station communicating with the first communication node and the base station communicating with the second communication node; and T3 comprises the maximum transmission delay or the reference transmission delay between the first network node and the second network node.

10. The method of claim 8, wherein the reception timing of the RS is determined as a time period before downlink transmission timing of the base station communicating with the first network node, wherein the time period is calculated as $TO-T3+T2$, wherein T0 comprises $N_{TA\ offset}$ of the cell of the base station in which the second network node is located;

T2 is determined according to one of the unidirectional transmission time between the second network node and the base station communicating with the first network node, the transmission time between the base station communicating with the first communication node and the base station communicating with the second communication node, the distance between the second network node and the base station communicating with the second network node, or the distance between the base station communicating with the first communication node and the base station communicating with the second communication node; and T3 comprises the maximum transmission delay or the reference transmission delay between the first network node and the second network node.

11. The method of claim 1, wherein the reception timing is downlink reception timing of downlink data; and the transmission timing is different from uplink transmission timing of uplink data.

12. The method of claim 11, wherein the transmission timing of the RS is determined by the second network node according to at least one of:

a unidirectional transmission time between the second network node and a base station communicating with the second network node;

a distance between the first network node and a base station communicating with the first network node;

a transmission time between the base station communicating with the first communication node and the base station communicating with the second communication node;

a distance between the base station communicating with the first communication node and the base station communicating with the second communication node;

$N_{TA\ offset}$ of the cell of the base station in which the second network node is located;

a unidirectional transmission time between the first network node a base station communicating with the first network node; and a maximum transmission delay or a reference transmission delay between the first network node and the second network node.

13. The method of claim 12, wherein the reception timing of the RS is determined by the second network node as a time period after the uplink transmission timing for uplink data, wherein the time period is calculated as T0+T1−T3+T2, wherein T0 comprises $N_{TA\ offset}$ of the cell of the base station in which the second network node is located;

T1 comprises the unidirectional transmission time between the second network node and the base station communicating with the second network node;

T2 is determined according to one of the unidirectional transmission time between the first network node the base station communicating with the first network node, the distance between the first network node and the base station communicating with the first network node, the transmission time between the base station communicating with the first communication node and the base station communicating with the second communication node, or the distance between the base station communicating with the first communication node and the base station communicating with the second communication node; and T3 comprises the maximum transmission delay or the reference transmission delay between the first network node and the second network node.

14. The method of claim 12, wherein the reception timing of the RS is determined by the second network node as a time period after downlink reception timing for normal downlink data, wherein the time period is calculated as T2−T1−T3, wherein $$T2 > T1 + T3;$$

T1 comprises the unidirectional transmission time between the second network node and the base station communicating with the second network node;

T2 is determined according to one of the unidirectional transmission time between the first network node the base station communicating with the first network node, the distance between the first network node and the base station communicating with the first network node, the transmission time between the base station communicating with the first communication node and the base station communicating with the second communication node, or the distance between the base station communicating with the first communication node and the base station communicating with the second communication node; and T3 comprises the maximum transmission delay or the reference transmission delay between the first network node and the second network node.

15. The method of claim 12, wherein the reception timing of the RS is determined by the second network node as a time period before downlink reception timing for normal downlink data, wherein the time period is calculated as T1+T3−T2, wherein $$T2 \leq T1 + T3;$$

T1 comprises the unidirectional transmission time between the second network node and the base station communicating with the second network node;

T2 is determined according to one of the unidirectional transmission time between the first network node the base station communicating with the first network node, the distance between the first network node and the base station communicating with the first network node, the transmission time between the base station communicating with the first communication node and the base station communicating with the second communication node, or the distance between the base station communicating with the first communication node and the base station communicating with the second communication node; and T3 comprises the maximum transmission delay or the reference transmission delay between the first network node and the second network node.

16. The method of claim 11, wherein the transmission timing of the RS is determined by the second network node according to at least one of:

a unidirectional transmission time between the second network node and a base station communicating with the second network node;

$N_{TA\ offset}$ of the cell of the base station in which the second network node is located;

a unidirectional transmission time between the first network node a base station communicating with the first network node;

a distance between the first network node and a base station communicating with the first network node;

a cell radius of a cell of the base station in which the first network node is located; and a maximum transmission delay or a reference transmission delay between the first network node and the second network node.

17. The method of claim 16, wherein the reception timing of the RS is determined by the second network node as a time period after uplink transmission timing for normal uplink data, wherein the time period is calculated as T0+T1–T3+T2, wherein T0 comprises $N_{TA\ offset}$ of the cell of the base station in which the second network node is located;

T1 comprises the unidirectional transmission time between the second network node and the base station communicating with the second network node;

T2 is determined according to one of the unidirectional transmission time between the first network node the base station communicating with the first network node, the distance between the first network node and the base station communicating with the first network node, or the cell radius of the cell of the base station in which the first network node is located; and T3 comprises the maximum transmission delay or the reference transmission delay between the first network node and the second network node.

18. A first network node comprising a first wireless communication device, comprising:

at least one processor configured to:

determine reception timing of a Reference Signal (RS), according to at least a time for transmitting a signal between the second network node and a base station in which the second network node is located, wherein the time for transmitting the signal is determined based at least in part on a cell radius of a cell of the base station in a the second network node is located, wherein the RS is transmitted by the second network node at a transmission timing, wherein the second network node comprises a second wireless communication device;

receive, via a receiver from the second network node, the RS according to the reception timing; and measure the RS to determine interference of the second network node on the first network node.

19. A wireless communication method, comprising:

send, by a second network node comprising a second wireless communication device, a Reference Signal (RS) according to a transmission timing, wherein the RS is received by a first network node comprising a first wireless communication device according to a reception timing, and the reception timing is determined by the first network node according to at least a time for transmitting a signal between the second network node and a base station in which the second network node is located, wherein the time for transmitting the signal is determined based at least in part on a cell radius of a cell of the base station in which the second network node is located, wherein the first network node measures the RS to determine interference of the second network node on the first network node.

20. A second network node comprising a second wireless communication device, comprising:

at least one processor configured to:

send, via a transmitter, a Reference Signal (RS) according to a transmission timing, wherein the RS is received by a first network node comprising a first wireless communication device according to a reception timing, and the reception timing is determined by the first network node according to at least a time for transmitting a signal between the second network node and a base station in which the second network node is located, wherein the time for transmitting the signal is determined based at least in part on a cell radius of a cell of a base station in which the second network node is located, wherein the first network node measures the RS to determine interference of the second network node on the first network node.

* * * * *